ular shaft to permit simultaneous movement of these heaters into and out of a position between the forming tools. The heaters are positioned, when the forming tools are apart as shown in FIGURE 1, one adjacent to each of the opposed surfaces of the platen 15 also located between the forming tools.

3,362,045
APPARATUS FOR THE MANUFACTURE OF HOLLOW PLASTIC ARTICLES

James Jones-Hinton, Tanworth-in-Arden, Solihull, and Thomas Edward Horace Gray, Wylde Green, Sutton Coldfield, England, assignors to Dunlop Rubber Company Limited, London, England, a British company
Filed Apr. 4, 1963, Ser. No. 270,753
Claims priority, application Great Britain, Apr. 10, 1962, 13,964/62
7 Claims. (Cl. 18—19)

This invention relates to the manufacture of hollow plastic articles.

According to the invention we provide apparatus for the manufacture of a hollow article from thermo-plastic sheet material which apparatus comprises a pair of opposed forming tools each having at least one cavity, means for moving the forming tools into contact with one another so that the cavities in association constitute a completely enclosed hollow-article-forming cavity, a platen for engaging on opposite surfaces plastic sheets from which the hollow articles is to be formed, means for heating the platen, means for moving the platen into and out of a position wherein it is located between the opposed forming tools, and means for connection to means for creating a pressure differential on opposite sides of sheets in engagement with the platen to cause the sheets to be moved into forming contact with the cavities.

Preferably each forming tool has a passage extending from the cavities to connect the cavities to air pressure reducing means to create the said pressure differential. Passages may also be provided in the platen, the passages extending from the opposed surfaces to connect these surfaces to means for creating a pressure differential. Consequently, air pressure may be reduced or increased at the opposed surfaces of the platen, respectively to assist in supporting the sheets on the platen or to assist in causing the sheets to be moved into forming contact with the cavities of the forming tools.

Apart from the means for heating the platen, it is preferable that additional heaters are provided movable into and out of a postion, one adjacent to each of the opposite sides of the platen.

It is preferable also that the platens are provided upon their opposed surfaces with outwardly extending dies for partially forming the sheets towards their finally moulded shape prior to engagement of the sheets with the forming tools. The dies may have a shape complementary to the internal shape of the hollow article to be formed or may be otherwise shaped.

The periphery of the cavity in one or both forming tools may have a raised knife edge formed around it for severing plastic sheets either against the surface of a platen or against an opposed forming tool.

Two embodiments of the invention will now be described, by way of example, with reference to the accompanying drawings in which.

Figure 1:
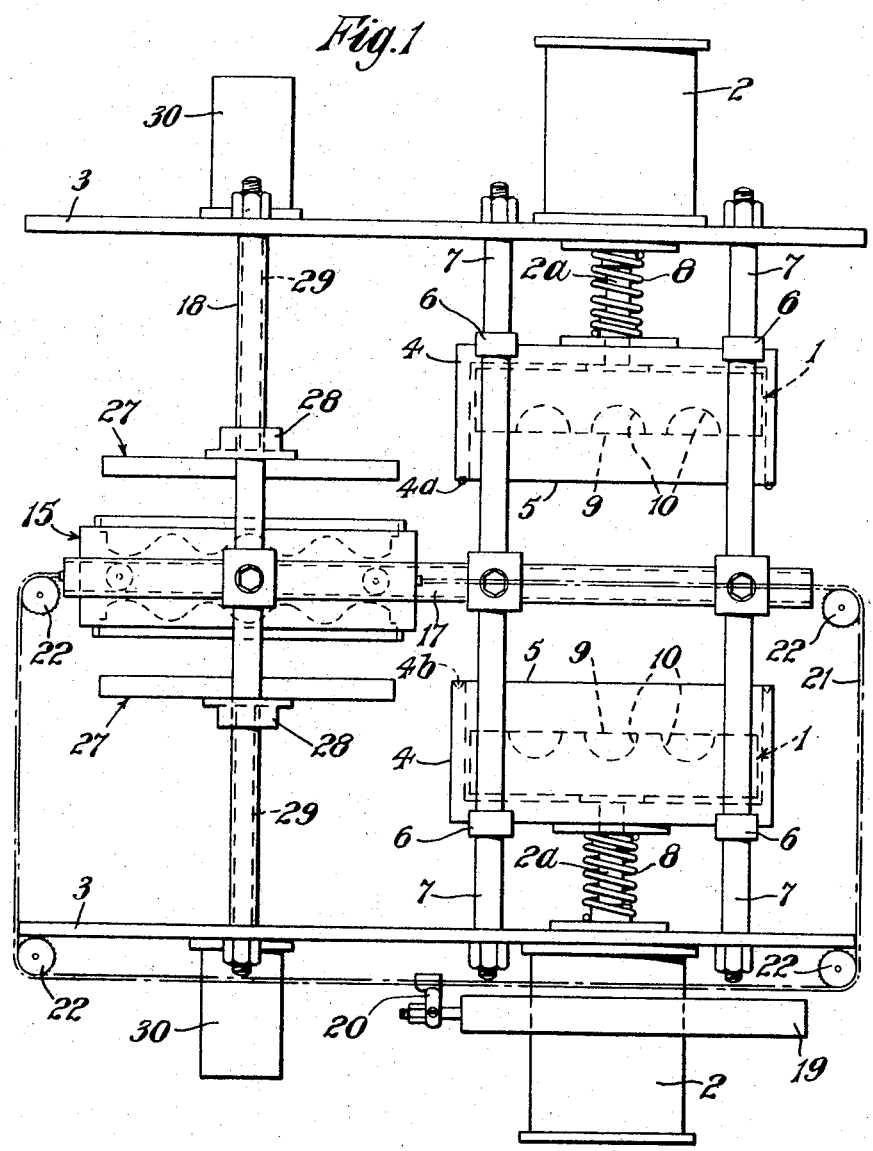
FIGURE 1 is a side elevation of apparatus forming one embodiment of the invention.
Figure 2:
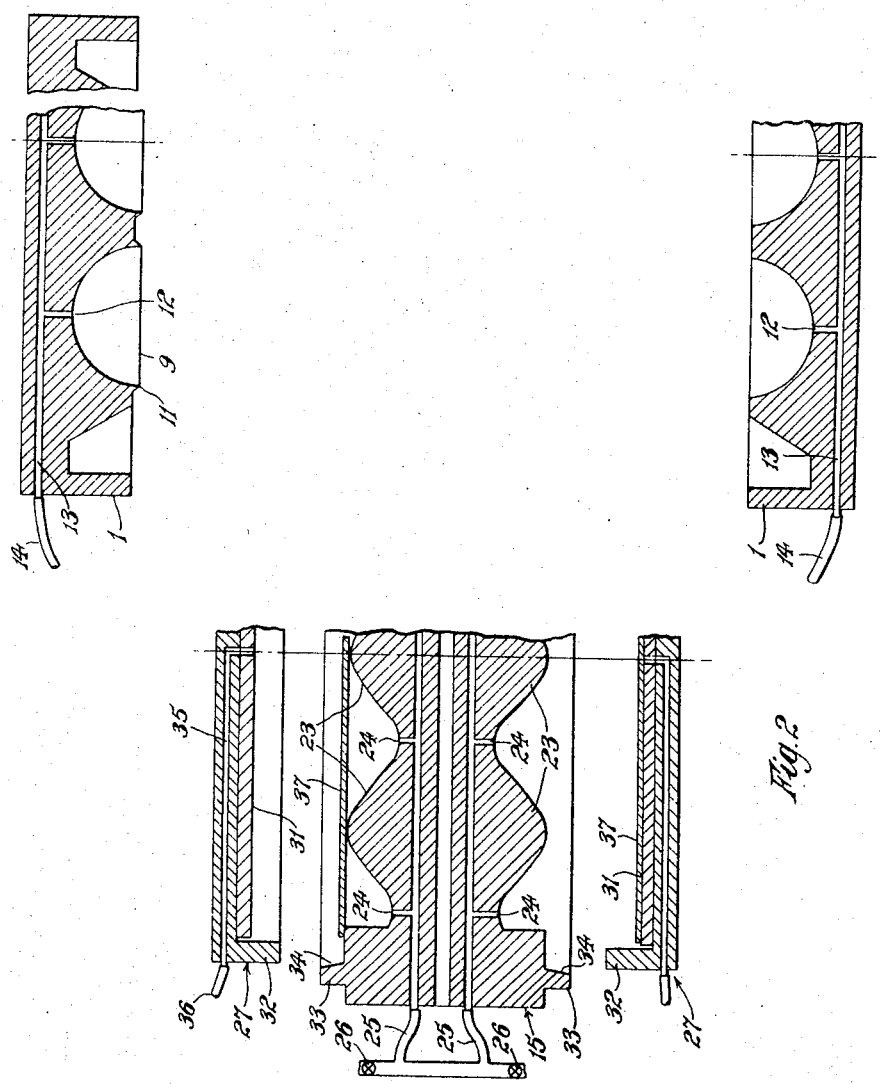
FIGURE 2 is a scrap cross-sectional view in the same direction as, but on a larger scale than FIGURE 1, of the apparatus shown in FIGURE 1.

In a first embodiment of the invention shown in FIGURES 1 and 2, apparatus for producing table tennis balls from thermo-plastic material comprises a pair of forming tools 1. The forming tools are mounted vertically one above the other, means being provided, in the form of two piston and cylinder assemblies 2 mounted on frame members 3, for moving the tools into and out of contact with one another. The forming tools are mounted by their remote surfaces to the piston rods 2a of these two assemblies.

A pair of opposed boxes 4 are mounted one around each of the forming tools, the opposed sides 5 of the boxes being open, as shown in FIGURE 1, to allow movement into contact with one another of the forming tools. The boxes are slidably mounted upon the piston rods of the assemblies 2 so that the forming tools are movable upon the piston rods relatively to the boxes, and guide means, in the form of four sleeves 6 secured to each box and slidable one upon each of four vertical guide shafts 7, are provided for guiding the boxes and the forming tools in their movement towards and away from one another.

Sealing means in the form of a rubber seal 4a is provided upon an opposing edge of one box to air-tightly seal a chamber within the boxes when the boxes are in mutual engagement by reception of the seal within a groove 4b provided around the opposing edge of the other box. A pipe (not shown) extends through a side of one of the boxes 4 to connect the interior of the box to pressure increasing means. Two compression springs 8 are located one around each piston rod 2a between its associated cylinder and box 4 to urge the boxes towards one another so that in a normal or inoperative state of the apparatus, as shown in FIGURE 1, the forming tools are retained within the boxes at a greater distance apart than the distance apart of the boxes.

The forming tools together co-operate to form table tennis balls and, for this purpose, are provided upon opposing surfaces 9 with a plurality of cavities 10 in the form of hemispheres. Each of the cavities is provided, as shown in FIGURE 2, with an integral raised portion 11 ground to form a knife edge which operates in a manner to be described.

In each forming tool, each of the cavities 10 is provided with a plurality of openings 12 (one only of which is shown for each cavity, in FIGURE 2) which extend into a common passage 13 formed in the forming tool, the passage 13 being connected by a flexible pipe 14 to air pressure reducing means (not shown).

A horizontally-disposed platen 15 is mounted by means of four wheels 16, upon a pair of guide rails 17 secured to the guide shafts 7 and to two other guide shafts 18, for movement of the platen between a position wherein it is located between the opposed forming tools 1 and a position removed from between the tools as shown in FIGURES 1 and 2. Means for moving the platen between these two positions comprises a double-acting piston and cylinder assembly 19 secured to the lower frame member 3, the piston rod of this assembly being secured by a bracket 20 to a link of chain 21 which extends around four sprockets 22 rotatably mounted upon the apparatus, the end of the chain being secured one to each end of the platen 15.

The platen is provided upon its upper and lower horizontal surfaces with a plurality of outwardly extending dies 23 (see particularly FIGURE 2), and passages 24 (a few only of which are shown) extend from the surfaces of the platen at the base of the dies, to connect said surfaces through pipes 25 and stop-valves 26 either to pressure reducing means (not shown) or to pressure increasing means (not shown).

The dies are positioned for location one within each of the cavities 10 of the forming tools, but are not of hemispherical form complementary to that of the cavities and take the form of humps which partially form a plastic sheet towards its finally moulded shape. The platen is also provided with heating means (not shown).

Two heaters 27 are located between the guide shafts 18 upon which they are slidably mounted by sleeves 28 secured to the heaters and slidably received upon the shafts. Each heater is secured to the end of the piston rod 29 of a double-acting pneumatic piston and cylinder assembly 30, the assemblies 30 being mounted one upon each of the members 3. Operation of the assemblies 30 in the appropriate direction moves the heaters into or out of position, one adjacent to each of the opposite sides (the upper and lower surfaces) of the platen, when the platen is in the position shown in FIGURES 1 and 2. Each heater is provided with a heating surface 31 (FIGURE 2) surrounded by a vertical flange 32 formed integrally with the heater. Upon movement of the heater towards the platen, the flange 32 enters within a vertical flange 33 formed on the platen and engages an inclined inner surface 34 of the flange to enclose a heating chamber between heater and platen.

A passage 35 extends from the heating surface of each heater and connects said surface through a pipe 36 to means (not shown) for creating a pressure differential on opposite sides of a plastic sheet carried upon said surface.

In the use of the apparatus, the parts of the apparatus are initially in their positions shown in FIGURE 1 with the platen 15 in a position removed from the forming tool and the heaters 27 in positions removed from the platen 15.

A sheet 37 of thermo-plastic material (FIGURE 2) is located upon the heating surface of the lower heater 27 and a second sheet 37 is positioned upon the upper surface of the platen 15. The heaters are then moved towards the platen to completely enclose the sheets 37 between the heater and the platen.

To soften the material, the heaters and the platen are heated and, during softening, air pressure is reduced between the sheets and the heaters through the passage 35, and the air pressure is increased between the platen and the sheets by connecting the passages 24 to the pressure increasing means, thereby holding the sheets in position against the heaters. When the sheets are sufficiently softened, the air pressure between the sheets and the heaters is returned to normal and the pressure between the sheets and the platen is reduced by operating the stop-valves 26 to connect the passages 24 with the means for reducing air pressure. This operation draws the softened sheets down around the dies 23 and into the hollows surrounding the dies so that the sheets are partially formed. With the sheets still held against the platen 15, the heaters 27 are withdrawn by the operation of the assemblies 30 after which the piston and cylinder assembly is operated to move the platen along the rail 17 into position between the forming tools 1.

The piston and cylinder assemblies 2 are then operated to move the boxes 4 and the forming tools towards the platen and when the boxes engage the upper and lower surfaces of the platen, thus preventing further movement of the boxes, the continued operation of the assemblies 2 overcomes the force of the springs 8 to move the forming tools down within the flanges 33 and around the sheets of material formed over the dies 23. When the forming tools are stationary, a pressured differential is created on opposite sides of each sheet 37 by connecting the passages 12 in the forming tools to the pressure reducing means to reduce the pressure between the surfaces of the cavities 10 and the sheets, and by increasing the pressure between the platen 15 and the sheets. This causes the partially formed sheets to be drawn onto and into close conformity with the forming surfaces of the cavities 10.

The assemblies 2 are then operated to remove the boxes and forming tools from the platen, the sheets on each forming tool now formed into a plurality of hemispherical shapes, one within each of the cavities 10. The platen is then removed to its initial position between the heaters 27 by operation of the piston and cylinder assembly 19. The boxes 4 and the forming tools are immediately brought together while the sheet is in a plastic and weldable state so that the edges of each hemispherical formed shape in one forming tool come into contact with the edges of another hemispherical shape in the other forming tool and are welded together by the closed forming tools. During this movement together, the boxes 4 and the forming tools initially move together until the boxes contact each other in air-tight engagement. The air-tight chamber sealed by the boxes is then pressurised, by connecting the pipe extending through the side of one of the boxes to the pressure increasing means, to pressurise the interior of the balls to be formed. Continued operation of the piston and cylinder assemblies 2 then axially compresses the springs 8, which provide means to ensure that the forming tools contact each other after the engagement of the boxes, to bring the forming tools into engagement, and bring the hemispherical shapes into contact to form completed balls. The knife edges 11 on the one tool contact the other forming tool to trim the edges of the plastic sheet so that the formed and welded table tennis balls are trimmed and separate from one another.

The passages 12 are then cut off from the pressure reducing means and, after a delay during which the thermoplastic sheet now formed into table tennis balls cool, the forming tools are opened and the table tennis balls removed.

In a modification of the apparatus described according to the first embodiment, the heaters 27 are movable by means of a piston and cylinder assembly into positions between the forming tools and boxes 4 when these are in their retracted positions. In use of this apparatus, the heaters are brought into engagement with the platen 15 to heat the sheets located thereon while the platen is positioned between the forming tools. It is then necessary to withdraw the heaters from between the forming tools before the forming tools can be brought into engagement with the platen to perform the forming operation.

In a further modification to the first embodiment, the portions of the dies 23 for insertion within the cavities 10 of the forming tools, are dome-shaped and each has a height which is substantially one half of the depth of its associated hemispherical-shaped cavity. In use, the sheets of material are partially formed towards their finally moulded shape and into domed form around the dies 23 by creating pressure differential conditions on opposite sides of each sheet while the sheets are in a softened state between the platen and the heaters as described above. When partially formed, each dome-shaped portion of each sheet is substantially one half of its finally moulded height. The platen is then located between the forming tools which are closed therearound as described in the first embodiment, and then while maintaining the sheets at substantially constant temperature, differential pressure conditions are created to form each of the dome-shaped portions into its finally moulded shape against the sides of its associated cavity.

It is found that when each half of a table tennis ball is partially formed in this manner before final forming within the mould cavity, that the finished ball is of substantially uniform thickness.

Figure 3:
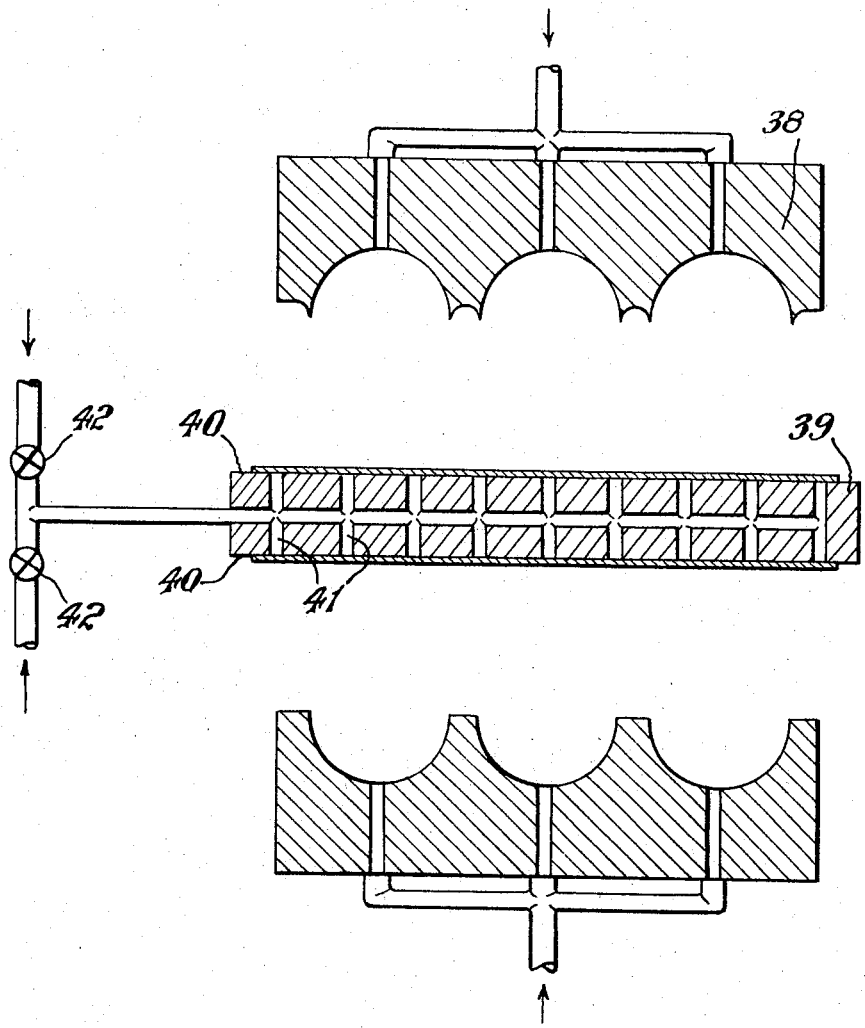
FIGURE 3 is a diagrammatic view in side elevation of a part of a second embodiment of the invention.

In a second embodiment shown in FIGURE 3, apparatus for the manufacture of tennis balls comprises forming tools 38 surrounded by boxes (not shown) and heaters (not shown) all of which are constructed in a similar manner to those described above for the first embodiment. The apparatus further comprises a platen 39 for supporting heated sheets of thermoplastic material, but this platen is not provided with outwardly extending dies as is the platen 15 of the first embodiment, but is provided upon each side with a planar surface 40 for supporting sheets of material. Passages 41 lead from the surfaces 40 for connection through stop-valves 42 either to pressure reducing means or pressure increasing means.

In the use of the apparatus for making tennis balls, the platen is initially positioned between the heaters and sheets of material located upon the platen 39 are heated in the manner described above, the only difference being that the heated sheets in this case remain in planar form upon the platen and are not partially formed. After heating, the platen is moved between the forming tools 1, as shown in FIGURE 3, and when the forming tools have been brought into engagement with the platen in the manner described in the first embodiment, the sheets of material are formed, by differential pressure conditions, from their planar form into hemispherical shapes conforming to the shapes of the cavities of the forming tools. The remainder of the operation to form the completed balls is similar to that described in the first embodiment.

In a modification of the second embodiment, a set of outwardly extending dies are provided for each forming tool, the dies being shaped in hemispherical form complementary to that of the cavities of the forming tools and each set of dies being carried upon a supporting base. Heating means are provided in the dies to maintain the sheets in a plastic state during forming.

In operation, the sheets of material are only formed partially into the cavities of the forming tools while the sheets are held upon the platen 39. The forming tools are then moved away from the platen which is then withdrawn from between the tools. The sets of dies are then located between the forming tools which are brought towards the dies, and during this movement, the dies project into the cavities so as to uniformly stretch the sheet as it is formed by the forming tools.

Having now described our invention, what we claim is:

1. Apparatus for the manufacture of a hollow article from thermoplastic sheet material comprising a pair of opposed forming tools each formed with at least one cavity opposed to a corresponding cavity in the other forming tool, means associated with the forming tools for moving them into and out of accurately-positioned contact with one another, so that the opposed cavities in association constitute a completely enclosed hollow article-forming cavity or cavities, a platen movable into and out of a position wherein it is located between the forming tools when the forming tools are out of contact with one another, means for moving said platen into and out of said positions, the platen having opposite surfaces for engaging thermoplastic sheets from which the article is to be formed, a heater having a heating surface and movable into and out of a position with said heating surface opposite one of said opposite surfaces of said platen, a second heater having a heating surface and movable into and out of a position with its heating surface opposite the other of said opposite surfaces of said platen, means for moving said heaters into and out of said positions, and means comprising at least one fluid conductor to provide a pressure differential on opposite sides of sheets in engagement with the platen to cause the sheets to be moved into forming contact with the cavities.

2. Apparatus according to claim 1 wherein each forming tool has a passage formed therein extending from each cavity through the tool, the platen has at least one passage formed therein extending therethrough from said opposite surfaces thereof and each heater has at least one passage formed therein extending therethrough from said heating surface, each passage being connectable to means for creating a pressure differential on opposite sides of each sheet.

3. Apparatus according to claim 1 wherein said opposite surfaces of each platen are each provided with at least one outwardly-extending die and a plurality of said passages are formed in the platen extending from the base of the die.

4. Apparatus according to claim 3 wherein each cavity of the forming tool is of hemispherical shape and each outwardly-extending die has a dome-shaped portion for insertion within an associated cavity.

5. Apparatus according to claim 4 wherein each dome-shaped portion has a height which is substantially one-half of the depth of the associated cavity.

6. Apparatus according to claim 1 provided with a heating means located internally of each die.

7. Apparatus according to claim 1 wherein the said movable heaters, when in engagement with the said platens are movable into and out of positions between the forming tools.

References Cited
UNITED STATES PATENTS

| | | | |
|---|---|---|---|
| 1,358,289 | 11/1920 | Cigol | 18—19 |
| 1,365,462 | 1/1921 | Crawford | 18—19 XR |
| 1,387,617 | 8/1921 | Roberts | 18—19 |
| 1,388,124 | 8/1921 | Roberts | 18—19 XR |
| 1,574,113 | 2/1926 | Roberts | 18—19 |

WILLIAM J. STEPHENSON, *Primary Examiner.*

ROBERT F. WHITE, *Examiner.*

M. R. DOWLING, *Assistant Examiner.*